US012585684B2

(12) United States Patent　　　　(10) Patent No.:　US 12,585,684 B2
Oikarinen et al.　　　　　　　　　　(45) Date of Patent:　　Mar. 24, 2026

(54) SYSTEM AND METHOD SUPPORTING LOG ANALYTICS OR OTHER LOG-RELATED FUNCTIONS ACROSS MULTIPLE SYSTEMS

(71) Applicant: Goldman Sachs & Co. LLC, New York, NY (US)

(72) Inventors: Matti J. Oikarinen, Los Altos, CA (US); Atte T. Lahtiranta, Los Altos, CA (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/611,521

(22) Filed: Mar. 20, 2024

(65) Prior Publication Data

US 2024/0330344 A1　　Oct. 3, 2024

Related U.S. Application Data

(60) Provisional application No. 63/492,826, filed on Mar. 29, 2023.

(51) Int. Cl.
| | |
|---|---|
| *G06F 16/338* | (2019.01) |
| *G06F 11/34* | (2006.01) |
| *G06F 16/3332* | (2025.01) |
| *G06F 16/335* | (2019.01) |
| *H04L 9/40* | (2022.01) |

(52) U.S. Cl.
CPC ........ *G06F 16/338* (2019.01); *G06F 11/3476* (2013.01); *G06F 16/3332* (2019.01); *G06F 16/335* (2019.01); *H04L 63/0807* (2013.01)

(58) Field of Classification Search
CPC .............. G06F 16/338; G06F 11/3476; G06F 16/3332; G06F 16/335; H04L 63/0807
USPC ......................................................... 707/722
See application file for complete search history.

(56) References Cited

U.S. PATENT DOCUMENTS

| | | | | |
|---|---|---|---|---|
| 10,235,417 | B1 * | 3/2019 | Sterin ................. | G06F 16/1805 |
| 10,394,915 | B1 * | 8/2019 | Raghavendran .... | G06F 16/9535 |
| 10,713,271 | B2 * | 7/2020 | Das ..................... | G06F 11/3476 |
| 11,500,783 | B1 * | 11/2022 | Aleti ..................... | G06F 12/121 |
| 2002/0107835 | A1 * | 8/2002 | Coram ............. | G06F 16/24539 |
| 2014/0122463 | A1 * | 5/2014 | Olivieri ............... | G06F 16/9574 |
| | | | | 707/722 |
| 2016/0125029 | A1 * | 5/2016 | Damm ................ | G06F 16/9535 |
| | | | | 707/722 |
| 2018/0091528 | A1 * | 3/2018 | Shahbaz ................. | G06F 21/53 |

* cited by examiner

*Primary Examiner* — Michael Pham

(57) ABSTRACT

A method includes receiving a user query identifying one or more criteria associated with logs or log-related information. The method also includes sending queries identifying the one or more criteria to multiple logging systems associated with different computing or networking systems. The method further includes obtaining responses from the logging systems, where at least some of the responses contain one or more logs or log-related information satisfying the one or more criteria. In addition, the method includes presenting the one or more logs or log-related information satisfying the one or more criteria to a user.

21 Claims, 4 Drawing Sheets

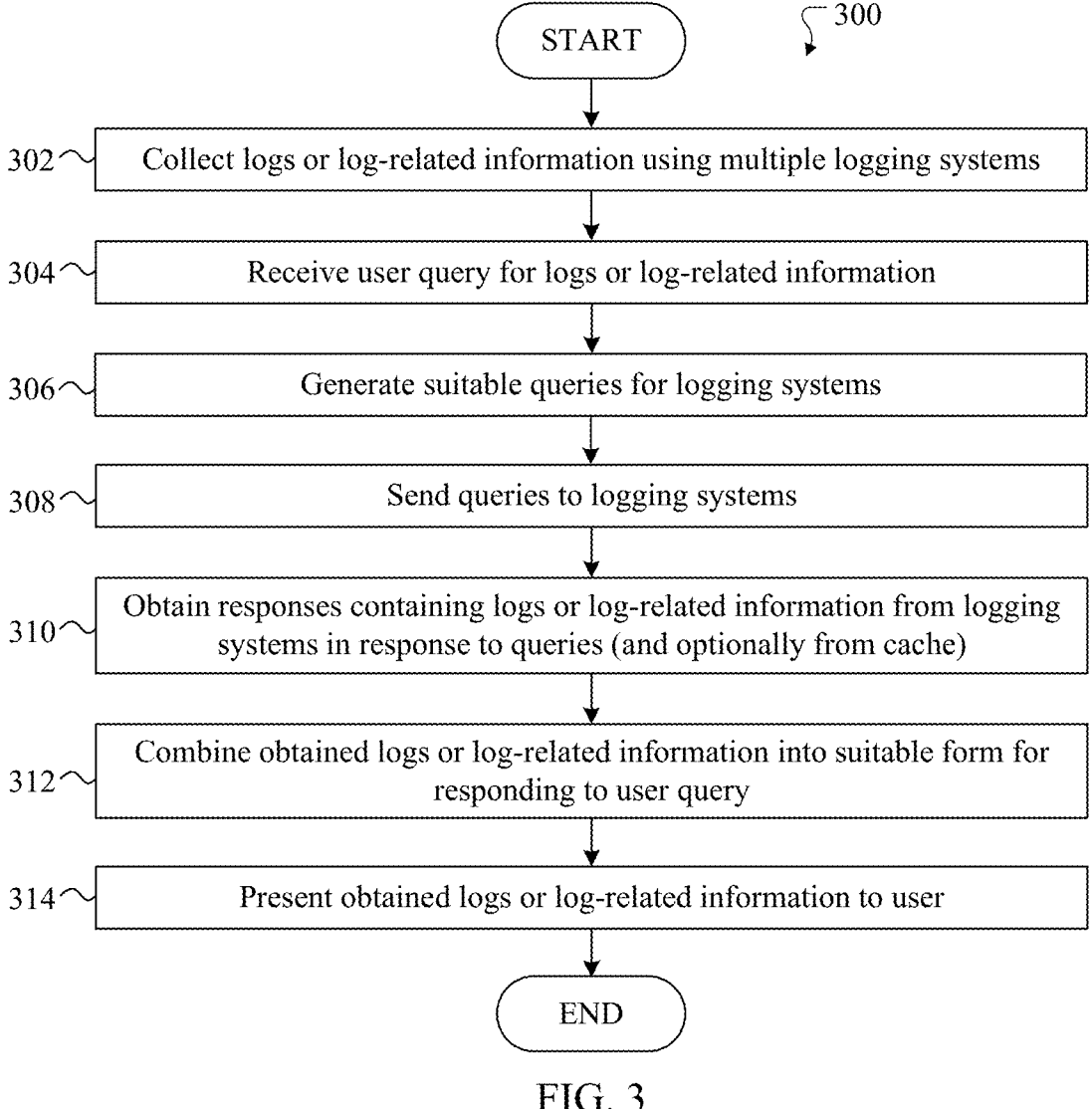

START

300

302 — Collect logs or log-related information using multiple logging systems

304 — Receive user query for logs or log-related information

306 — Generate suitable queries for logging systems

308 — Send queries to logging systems

310 — Obtain responses containing logs or log-related information from logging systems in response to queries (and optionally from cache)

312 — Combine obtained logs or log-related information into suitable form for responding to user query 314 — Present obtained logs or log-related information to user

END

FIG. 3

SYSTEM AND METHOD SUPPORTING LOG ANALYTICS OR OTHER LOG-RELATED FUNCTIONS ACROSS MULTIPLE SYSTEMS

CROSS-REFERENCE TO RELATED APPLICATION AND PRIORITY CLAIM

This application claims priority under 35 U.S.C. § 119 (e) to U.S. Provisional Patent Application No. 63/492,826 filed on Mar. 29, 2023, which is hereby incorporated by reference in its entirety.

TECHNICAL FIELD

This disclosure is generally directed to computing and networking systems. More specifically, this disclosure is directed to a system and method supporting log analytics or other log-related functions across multiple systems.

BACKGROUND

Many computing and networking systems include devices that generate logs or log-related information. For example, a logging system can be used to capture and store information about events that occur involving one or more applications executed by one or more devices in a computing or networking system or information about events that occur involving the one or more devices of the computing or networking system. In some cases, a computing or networking system includes a centralized logging system, which can collect logs or log-related information from multiple devices in the computing or networking system and store the logs or log-related information in a centralized manner.

SUMMARY

This disclosure relates to a system and method supporting log analytics or other log-related functions across multiple systems.

In a first embodiment, a method includes receiving a user query identifying one or more criteria associated with logs or log-related information. The method also includes sending queries identifying the one or more criteria to multiple logging systems associated with different computing or networking systems. The method further includes obtaining responses from the logging systems, where at least some of the responses contain one or more logs or log-related information satisfying the one or more criteria. In addition, the method includes presenting the one or more logs or log-related information satisfying the one or more criteria to a user.

In a second embodiment, an apparatus includes at least one processing device configured to receive a user query identifying one or more criteria associated with logs or log-related information. The at least one processing device is also configured to send queries identifying the one or more criteria to multiple logging systems associated with different computing or networking systems. The at least one processing device is further configured to obtain responses from the logging systems, where at least some of the responses contain one or more logs or log-related information satisfying the one or more criteria. In addition, the at least one processing device is configured to present the one or more logs or log-related information satisfying the one or more criteria to a user.

In a third embodiment, a non-transitory computer readable medium contains instructions that when executed cause at least one processor to receive a user query identifying one or more criteria associated with logs or log-related information. The non-transitory computer readable medium also contains instructions that when executed cause the at least one processor to send queries identifying the one or more criteria to multiple logging systems associated with different computing or networking systems. The non-transitory computer readable medium further contains instructions that when executed cause the at least one processor to obtain responses from the logging systems, where at least some of the responses contain one or more logs or log-related information satisfying the one or more criteria. In addition, the non-transitory computer readable medium contains instructions that when executed cause the at least one processor to present the one or more logs or log-related information satisfying the one or more criteria to a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3 and 4 illustrate example methods supporting log analytics or other log-related functions across multiple systems according to this disclosure.

DETAILED DESCRIPTION

Figure 1:
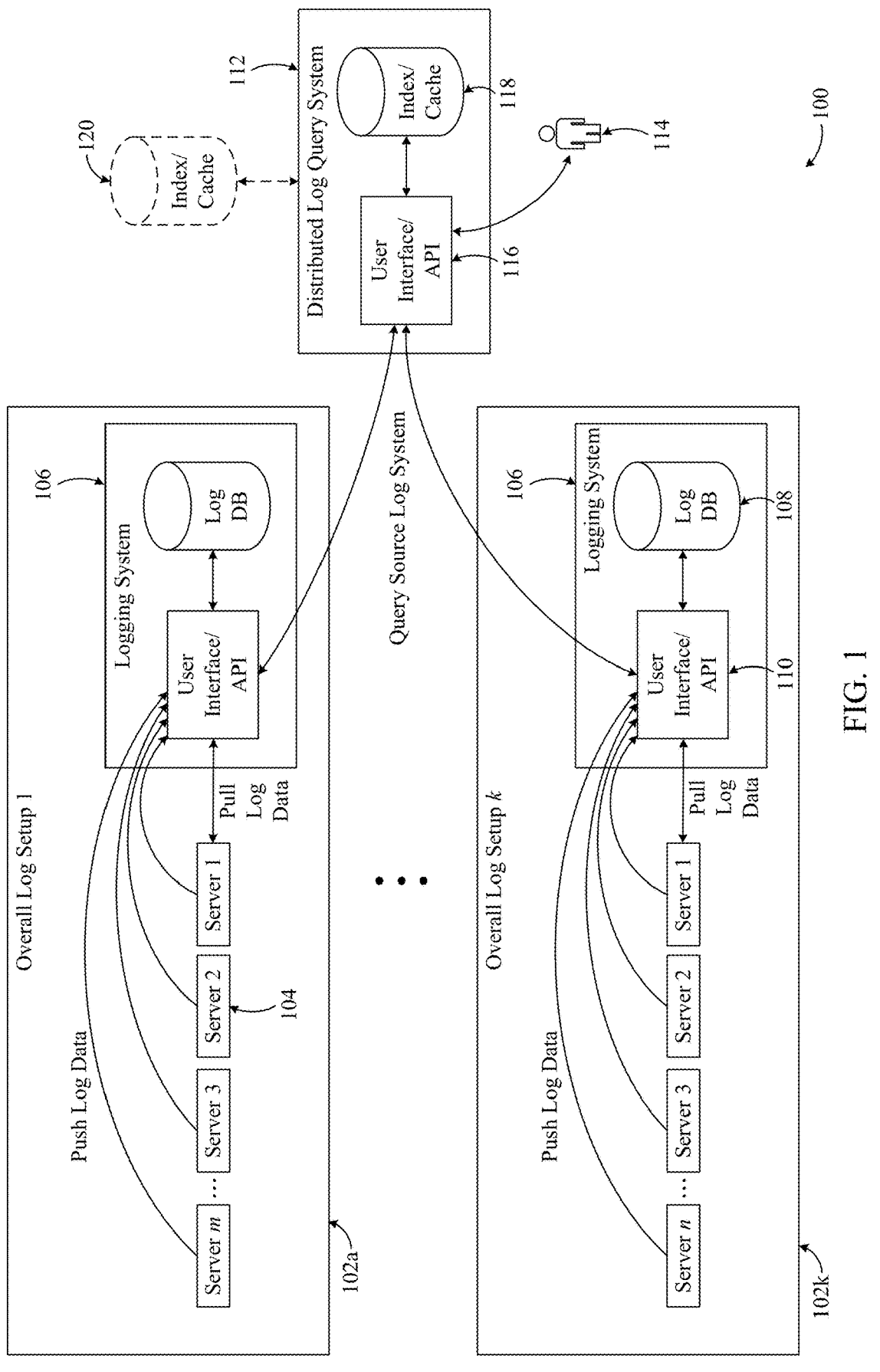
FIG. 1 illustrates an example system supporting log analytics or other log-related functions across multiple systems according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, many computing and networking systems include devices that generate logs or log-related information. For example, a logging system can be used to capture and store information about events that occur involving one or more applications executed by one or more devices in a computing or networking system or information about events that occur involving the one or more devices of the computing or networking system. In some cases, a computing or networking system includes a centralized logging system, which can collect logs or log-related information from multiple devices in the computing or networking system and store the logs or log-related information in a centralized manner.

Unfortunately, some organizations, such as large companies or governmental entities, have multiple logging systems in use, which makes it challenging to perform cross-system logs analytics or perform other functions. For example, cross-system analytics may be needed or desired to diagnose operational issues across multiple systems that depend on each other, resolve security incidents (such as to locate different logs where a malicious Internet Protocol address was seen), or find personal identifiable information (PII) (such as to comply with General Data Protection Regulation data requests or other requests where a consumer would like to delete or request his or her personal information).

Common approaches for cross-system analytics include the use of centralized log management (which uses a single system to store logs from multiple systems in a single storage) and log forwarding (which sends logs from multiple systems to a centralized system while maintaining separate storages). However, the use of centralized log management can be difficult to implement in various circumstances, such as in public cloud computing networks in which cloud providers store logs in native logging systems. Also, the use of log forwarding typically increases costs significantly since logs are copied across different systems, which increases storage and data transfer costs. Moreover, each logging system typically includes its own unique interface and possibly its own unique querying syntax, which can make it difficult for users to query multiple systems. In addition, the use of multiple logging systems can make it difficult to enforce organization-wide policies on the use of the logging systems or on the use of information collected by the logging systems.

This disclosure provides various techniques supporting log analytics or other log-related functions across multiple systems. As described in more detail below, a distributed log query system can be used to access logs or log-related information in multiple systems and obtain logs or log-related information from those multiple systems satisfying user queries. In some cases, a user may initiate a query of the logs or log-related information via a graphical user interface. The distributed log query system can automatically generate suitable queries for different systems in order to obtain desired logs or log-related information. Obtained logs or log-related information can be processed, such as to combine information from different systems into a single coherent view of the information, and presented or otherwise used. In some cases, information retrieved in response to user queries or at other times may be cached locally or remotely by the distributed log query system, and the distributed log query system may initially determine if requested information is present in the cache before querying other systems.

In this way, these techniques can simplify querying of multiple logging systems and avoid the need to copy entire logs across different systems. Moreover, the distributed log query system can be configured to support each logging system's interface and querying and response syntaxes, which can enable the distributed log query system to obtain logs or log-related information from various types of logging systems. This can also be done transparently from the user's perspective, so the user is not required to have knowledge of how each logging system can be accessed and queried. In addition, the distributed log query system can be used to enforce organization-wide policies on the use of the logging systems or on the use of information collected by the logging systems. Various functions and features of the distributed log query system are provided below, and one, some, or all of these functions and features may be used in any specific implementation of the distributed log query system.

FIG. 1 illustrates an example system 100 supporting log analytics or other log-related functions across multiple systems according to this disclosure. As shown in FIG. 1, the system 100 includes or is used in conjunction with multiple computing or networking systems 102a-102k. In this example, there are two computing or networking systems 102a-102k shown, although the system 100 may include more than two computing or networking systems 102a-

102k. Each computing or networking system 102a-102k includes multiple computing or networking devices 104. In this example, the computing or networking devices 104 represent servers, although each computing or networking system 102a-102k may include any desired type(s) and number(s) of computing or networking devices 104. At least some of the computing or networking devices 104 in each computing or networking system 102a-102k can generate logs or log-related information. For instance, at least some of the computing or networking devices 104 in each computing or networking system 102a-102k can generate logs or log-related information associated with events related to one or more applications executed by the computing or networking devices 104 or events related to other operations of the computing or networking devices 104.

Each computing or networking system 102a-102k includes at least one logging system 106, which can collect and store the logs or log-related information obtained from the computing or networking devices 104 in that computing or networking system 102a-102k. For example, each logging system 106 may include at least one log database 108, which can be used to store the logs or log-related information obtained from the computing or networking devices 104 in the corresponding computing or networking system 102a-102k. The logging system 106 may obtain the logs or log-related information in any suitable manner. For instance, in some embodiments, the computing or networking devices 104 may push the logs or log-related information to the logging system 106 for storage. In other embodiments, the logging system 106 may pull the logs or log-related information into the logging system 106 from the computing or networking devices 104 for storage. In this example, the information in each log database 108 may be accessed and queried via a user interface/application programming interface (API) 110. In some cases, two or more logging systems 106 can each have its own unique user interface/API 110, which may use its own unique querying and response syntaxes to support searching of the associated log database 108.

Each computing or networking system 102a-102k includes any suitable system in which logs or log-related information is generated. For example, at least one computing or networking system 102a-102k may represent a private computing or networking system, such as a company or other organization's collection of servers, switches, routers, or other computing or networking equipment. As another example, at least one computing or networking system 102a-102k may represent a cloud-based environment, such as an AMAZON WEB SERVICES (AWS) platform or a GOOGLE CLOUD PLATFORM (GCP) platform. Each logging system 106 includes any suitable system for collecting or otherwise obtaining logs or log-related information, such as the SPLUNK unified security and observability platform or the AWS CLOUDWATCH platform.

A distributed log query system 112 can be used to query multiple logging systems 106 and obtain logs or log-related information satisfying various queries. For example, at least one user 114 may submit queries to the distributed log query system 112 looking for specific information, such as information related to a specific Internet Protocol (IP) address, information related to a specific individual, or information related to specific hardware or software asset within one or more computing or networking systems 102a-102k. The distributed log query system 112 can generate queries for the individual logging systems 106, submit the queries through the user interfaces/APIs 110 of the logging systems 106, and receive information from the logging systems 106 satisfying the queries. The distributed log query system 112 can also combine the information received in response to the queries, perform any desired processing, and present the resulting information to the user(s) 114.

In some cases, the distributed log query system 112 can be accessed and queries can be submitted by the users 114 via a user interface/API 116, which may represent any suitable mechanism for accessing the distributed log query system 112. For instance, the user interface/API 116 may be accessed by users 114 via their web browsers or using a native application. In some embodiments, each user 114 may only need to know how to access and use the distributed log query system 112 using the user interface/API 116, and the users 114 need not have any knowledge about how the individual logging systems 106 are accessed and queried using their user interfaces/APIs 110.

Note that while the distributed log query system 112 is shown here as being separate from the computing or networking systems 102*a*-102*k* and separate from the logging systems 106, this need not be the case. For example, the distributed log query system 112 may be implemented within the logging system 106 of one of the computing or networking systems 102*a*-102*k*. In these types of implementations, the distributed log query system 112 may be used to query the logs or log-related information obtained by the logging system 106 in which the distributed log query system 112 is implemented and by at least one additional logging system 106 (such as an external logging system 106 in a different computing or networking system 102*a*-102*k*). As another example, the distributed log query system 112 may be implemented within one of the computing or networking systems 102*a*-102*k* but separate from the logging system 106 of that computing or networking system 102*a*-102*k*.

In the type of approach illustrated in FIG. 1, each user 114 is able to use a centralized user interface/API 116 in order to perform queries of multiple logging systems 106, which may be distributed across a number of different computing or networking systems 102*a*-102*k*, rather than use each individual logging system's user interface/API 110. The distributed log query system 112 is able to query various logging systems 106, obtain desired information from one or more of those logging systems 106, and present the retrieved information or information based on the retrieved information to the user(s) 114. Even if the logging systems 106 have significantly different user interfaces/APIs 110, the distributed log query system 112 enables rapid querying of those logging systems 106.

In some embodiments, the distributed log query system 112 includes at least one local index/cache 118 and/or has access to at least one remote index/cache 120, each of which can be used to store information retrieved from the logging systems 106 in response to one or more user queries or at other times. For example, the distributed log query system 112 may store information retrieved from the logging systems 106 and perform indexing of the stored information, which may be done for performance optimization or other purposes. In some cases, at least one logging system 106 may support the use of data buckets associated with different time periods, where logs or log-related information are placed into different data buckets depending on timestamps associated with events being recorded in the logs or log-related information. Here, the distributed log query system 112 may periodically retrieve the information contained in one or more data buckets (such as the data bucket or buckets associated with the past hour or other recent time period or periods) and index and store the retrieved information in the local index/cache 118, the remote index/cache 120, or both. Among other things, this may allow for faster querying of more-recent logs or log-related information.

Note that indexing and/or caching may be limited to specific types of data, such as to specific fields or tags contained in the retrieved logs or log-related information. Also note that indexing and/or caching may be limited by time, such as to a specific time range based on log entry timestamps. In some cases, indexing and/or caching may be partitioned by user or group of logs in order to implement authorization that is based on user access levels. Also, in some cases, indexing and/or caching may use one-way encryption (such as hashing), tokenization, or other encryption mechanism to avoid storing unprotected sensitive information locally or remotely, which can be done to improve security or avoid storing personal identifiable information.

If a query from a user 114 can be satisfied using information stored in the local index/cache 118 and/or the remote index/cache 120, there may be no need for the distributed log query system 112 to send any queries to the logging systems 106. In other cases, one or more logging systems 106 may be queried to obtain information that may be combined or otherwise used with information from the local index/cache 118 and/or the remote index/cache 120. For instance, one or more logging systems 106 may be queried to obtain full or more-recent results, or only statistical data may be returned from the logging system(s) 106. Among other things, caching can be used to speed up user queries, such as those that are repeated by one or more users 114. In some cases, the distributed log query system 112 may query the logging systems 106 based on a time range, which can be done to avoid querying a time range that was previously cached. Also, indexing can be used to create rich dashboards for statistics without needing to query all logging systems 106. In some embodiments, indexing may be performed based on log forwarding (where a logging system 106 pushes its log feeds or data producers otherwise push information to the distributed log query system 112) or pulling (where the user interface/API 116 polls or listens for changes in logging systems 106 to populate a local or remote index or cache).

In some embodiments, the user interface/API 116 can implement an authentication or authorization process for log accesses. In particular embodiments, the authentication or authorization process may be uniform for all users 114 and may enforce consistent organization-wide policies on the use of the logging systems 106/distributed log query system 112 or on the use of information collected by the logging systems 106/distributed log query system 112. In some cases, different users 114 may have different levels of access to log information, such as when a role-based access control (RBAC) model is used.

Depending on the implementation, the user interface/API 116 may expose the query and response syntaxes that are specific to different logging systems 106, or the user interface/API 116 may translate user queries from a common syntax to the query syntaxes that are specific to different logging systems 106 and convert query responses from custom syntaxes that are specific to different logging systems 106 to a common syntax. Also, depending on the implementation, the user interface/API 116 may expose the user interfaces/APIs 110 of the logging systems 106 to the users 114 (such as by showing the user interfaces/APIs 110 in one or multiple views), or the user interface/API 116 may abstract the user interfaces/APIs 110 of the logging systems 106.

The distributed log query system 112 may be able to perform various additional functions involving the logging systems 106. For example, in some embodiments, the user interface/API 116 may allow one or more users 114 to coordinate log retention times across different computing or networking systems 102*a*-102*k* to achieve a desired result (such as to optimize costs). As a particular example, the SPLUNK unified security and observability platform has rich query capabilities but has higher costs, while the AWS S3 storage service has more-limited query capabilities but has lower costs. Thus, the user interface/API 116 may allow users 114 to specify that the SPLUNK unified security and observability platform will be used to store more-recent log data (such as data over the past month) and that the AWS S3 storage service will be used to store older data. Note that the same or similar types of functionalities may occur with other or additional platforms or storage services. As a result of this, the distributed log query system 112 may store some of the obtained information from the logging systems 106 in the local index/cache 118 and some of the obtained information from the logging systems 106 in the remote index/cache 120, such as a cloud-based storage. In these embodiments, data from the logging systems 106 may be stored in different storage locations, and the different storage locations may have different query capabilities, different costs, or both. Note that this can apply to data pre-cached by the distributed log query system 112, data retrieved from the logging systems 106 in response to user queries, and/or other suitable data obtained by the distributed log query system 112.

Although FIG. 1 illustrates one example of a system 100 supporting log analytics or other log-related functions across multiple systems, various changes may be made to FIG. 1. For example, the system 100 may include any suitable number of each component in any suitable arrangement. Also, one or more instances of the distributed log query system 112 may be used in any other suitable system. In addition, while various user interfaces/APIs 110 and 116 are shown here, other implementations (such as those supporting direct queries without the use of APIs) may be used.

Figure 2:
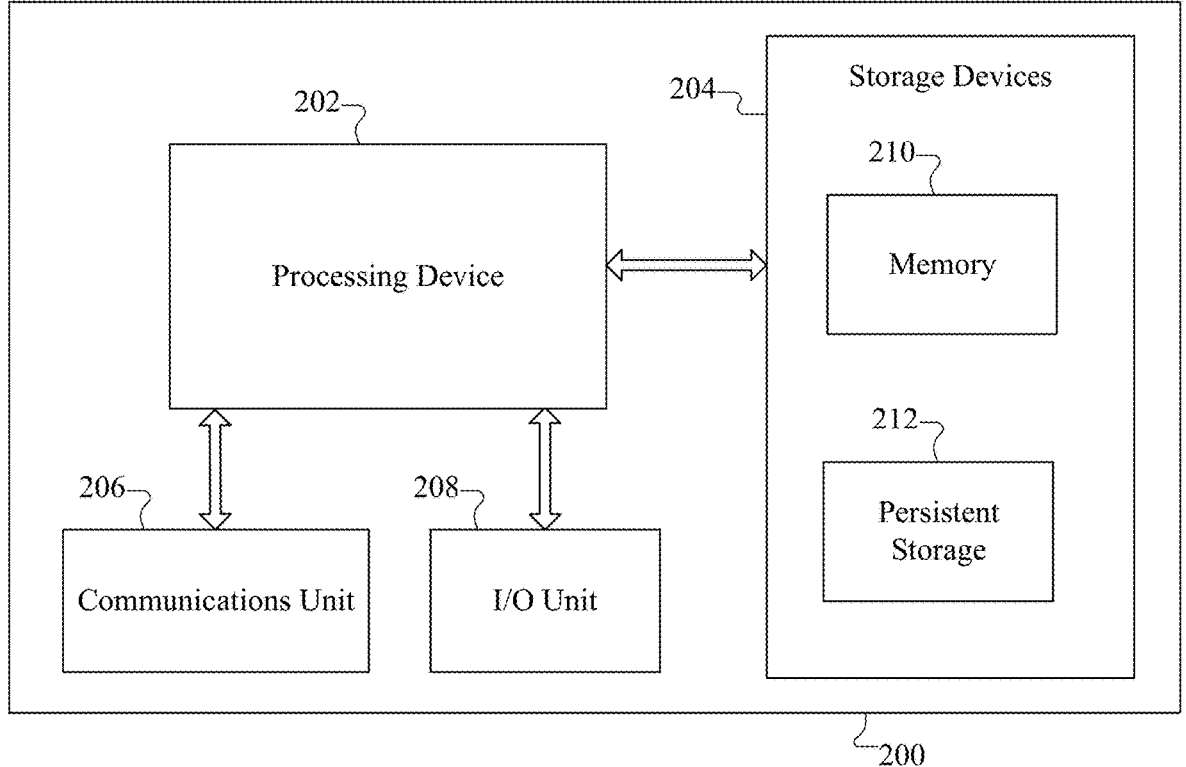
FIG. 2 illustrates an example device supporting log analytics or other log-related functions across multiple systems according to this disclosure.

FIG. 2 illustrates an example device 200 supporting log analytics or other log-related functions across multiple systems according to this disclosure. One or more instances of the device 200 may, for example, be used to at least partially implement the functionality of each of the logging systems 106 and the distributed log query system 112 in FIG. 1. Note, however, that each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting log analytics or other log-related functions across multiple systems, various changes may be made to FIG. 2. For example, computing and communication devices and systems come in a wide variety of configurations, and FIG. 2 does not limit this disclosure to any particular computing or communication device or system.

The devices and systems described above may support a number of different operations and process flows. The following are non-limiting examples of operations and process flows that may be performed by or using the devices and systems described above. Note, however, that the devices and systems described above may be used in any other suitable manner.

Figure 4:
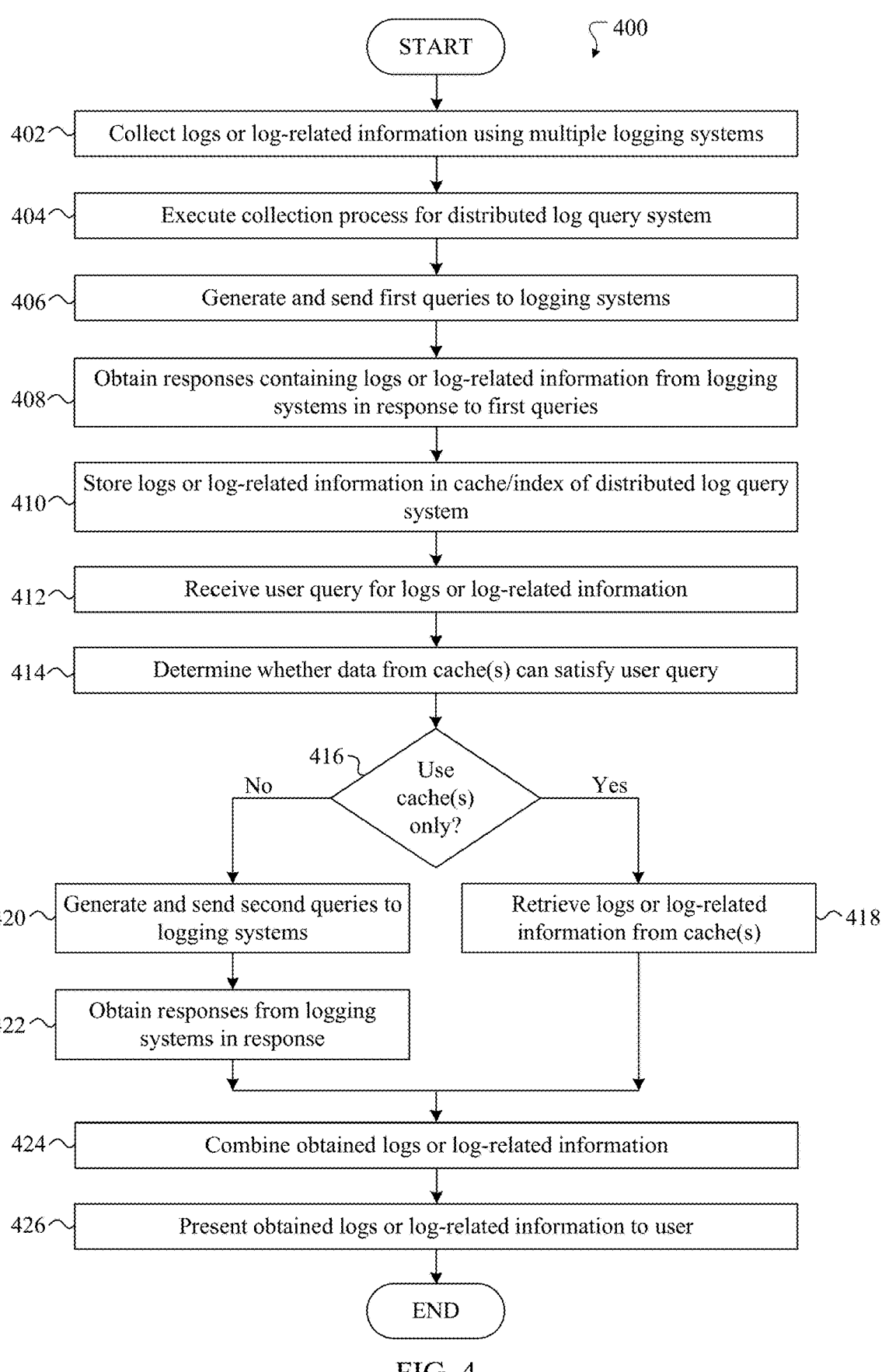

FIGS. 3 and 4 illustrate example methods 300 and 400 supporting log analytics or other log-related functions across multiple systems according to this disclosure. For ease of explanation, each method 300 and 400 is described as being performed within the system 100 of FIG. 1 using the distributed log query system 112, which may be at least partially implemented using one or more instances of the device 200 shown in FIG. 2. However, each method 300 and 400 may be implemented using any other suitable device(s) and in any other suitable system(s).

As shown in FIG. 3, logs or log-related information is collected using multiple logging systems at step 302. This may include, for example, each logging system 106 collecting and storing logs or log-related information obtained from computing or networking devices 104 in an associated computing or networking system 102*a*-102*k*. This logging data collection process flow here may be implemented independent of a querying process flow, which is described in the subsequent steps. In some embodiments, the computing or networking devices 104 may push the logs or log-related information to the logging system 106 for storage. In other embodiments, the logging system 106 may pull the logs or log-related information into the logging system 106 from the computing or networking devices 104 for storage. Each logging system 106 may obtain the logs or log-related information in any suitable manner, and this may occur asynchronously from other operations and process flows described below.

A user query for logs or log-related information is received at step 304. This may include, for example, the processing device 202 of the distributed log query system 112 receiving a user query from a user 114. The user 114 may access the distributed log query system 112 and submit the user query in any suitable manner, such as by using a web browser or native application to access the user interface/API 116 of the distributed log query system 112. The query can request any logs or log-related information satisfying one or more criteria specified by the user 114. In some embodiments, the user 114 may need to be authenticated before, during, or after submission of a query, such as via submission of a username and password or via another authentication mechanism.

Suitable queries for the multiple logging systems are generated at step 306 and sent to the logging systems at step 308. This may include, for example, the processing device 202 of the distributed log query system 112 generating a query for each logging system 106 using the querying syntax supported by that logging system 106. In some embodiments, the query from the user 114 may be received using a generic query syntax or some other specified, and the generic or other specified query syntax may be converted into an appropriate query syntax for each logging system 106 being queried. Note that this conversion may not be necessary for each logging system 106, such as when the query is received from the user 114 in a form suitable for use by one, some, or all of the logging systems 106. This may also include the processing device 202 of the distributed log query system 112 sending the queries to the user interfaces/ APIs 110 of the logging systems 106 so that the logging systems 106 can retrieve logs or log-related information satisfying the queries from their log databases 108. Note that if authentication is needed to access each logging system 106, an authentication token may be sent from the distributed log query system 112 to each logging system 106 for use in allowing access to data stored by that logging system 106. The authentication token may, for instance, be generated based on the user's authentication with the distributed log query system 112. Note that the logging systems 106 may be queried in parallel, sequentially, or in any other suitable manner.

Responses from the logging systems containing logs or log-related information satisfying the user query are obtained at step 310, and the obtained logs or log-related information may optionally be combined at step 312. This may include, for example, the processing device 202 of the distributed log query system 112 obtaining responses from the logging systems 106, where at least some of the responses contain one or more logs or log-related information satisfying the one or more criteria specified by the user 114 in the user query. In some embodiments, responses from the logging systems 106 may be received in response syntaxes (possibly custom response syntaxes), and the responses may be converted into a generic or other specified response syntax for presentation or other use. One specific example of this may be converting timestamps from custom formats into a standard specified format. Note that the information obtained at step 310 may optionally include some information obtained from at least one index/cache (without querying at least one of the logging systems 106), such as when information related to the user query can be retrieved from the at least one local index/cache 118, at least one remote index/cache 120, or both. Also note that the logs or log-related information in the responses can also optionally be indexed and/or cached and stored in the at least one local index/cache 118, the at least one remote index/cache 120, or both.

The obtained logs or log-related information is presented to the user or used in some other manner at step 314. This may include, for example, the processing device 202 of the distributed log query system 112 generating a graphical display that includes the obtained logs or log-related information. The logs or log-related information obtained from different logging systems 106 may be presented together (such as in a common window pane) or separately (such as in different window panes) depending on the implementation. The user 114 may use the information in any suitable manner, such as copying the information into another application for use, analyzing the displayed information, or sending the information to another user or storage location.

As shown in FIG. 4, logs or log-related information is collected using multiple logging systems at step 402. This may occur in the same or similar manner as step 302 described above. A collection process is executed by a distributed log query system at step 404. This may include, for example, the processing device 202 of the distributed log query system 112 executing a process that causes the distributed log query system 112 to pre-cache logs or log-related information. As described below, this allows the distributed log query system 112 to check at least one local index/cache 118 or at least one remote index/cache 120 to determine whether requested logs or log-related information satisfying a user query has previously been cached.

To support pre-caching, the collection process can cause the distributed log query system to generate and send first requests for information to the logging systems at step 406 and receive responses to the first requests containing the information from the logging systems at step 408. This may include, for example, the processing device 202 of the distributed log query system 112 sending requests for certain logs or log-related information (such as more-recent logs or log-related information) to the logging systems 106 and receiving responses to the requests. Note, however, that the logging systems 106 may also provide information to the distributed log query system 112 without waiting for the first requests, such as when the logging systems 106 push information to the distributed log query system 112 rather than waiting for the distributed log query system 112 to pull the information from the logging systems 106. Also, at least some of the pre-cached may also or alternatively represent logs or log-related information obtained in response to previous user queries. In some cases, the collection process can represent a background task that may be executed by the distributed log query system 112 without user interaction. The obtained information is stored in at least one index/ cache in or accessible by the distributed log query system at step 410. This may include, for example, the processing device 202 of the distributed log query system 112 storing the obtained information in at least one of the local index/ cache 118 and the remote index/cache 120.

A user query for logs or log-related information is received at step 412. This may occur in the same or similar manner as step 304 described above. A determination is made whether the user query can be satisfied only using data from at least one index/cache at step 414. This may include, for example, the processing device 202 of the distributed log query system 112 determining whether the user query is requesting data from logging systems 106 that has already been obtained and stored in the local index/cache 118 and/or the remote index/cache 120. If the user query can be satisfied using only cached information, cached information satisfying the one or more criteria specified by the user in the user query is retrieved from the cache at step 418. This may include, for example, the processing device 202 of the distributed log query system 112 retrieving logs or log-related information from the local index/cache 118 and/or the remote index/cache 120 for use in satisfying the user query. In this case, no queries may need to be sent to any logging systems 106.

If there is no cache or if the cached information that is available does not completely satisfy the one or more criteria specified by the user, this results in a determination that not all of the logs or log-related information satisfying the one or more criteria is contained in the cache. The distributed log query system sends second queries to the logging systems requesting information satisfying the one or more criteria specified by the user at step 420. This may occur in the same or similar manner as steps 306-308 described above. Responses from the logging systems are obtained in response to the second queries at step 422. This may occur in the same or similar manner as step 310 described above. Again, note that the logging systems 106 may be queried in parallel, sequentially, or in any other suitable manner. Also note that the logs or log-related information in the responses can also optionally be indexed and/or cached and stored in the at least one local index/cache 118, the at least one remote index/cache 120, or both.

It should be noted here that while FIG. 4 illustrates a binary determination (yes or no) at step 414, it is possible for information to be both retrieved from cache and obtained from one or more logging systems. For example, there may be some information satisfying a user query in the local index/cache 118 and/or the remote index/cache 120 and other information satisfying the user query in one or more of the logging systems 106. Thus, it is possible for the distributed log query system 112 to obtain information from at least one index/cache 118, 120 and obtain other information from one or more logging systems 106. In some cases, it may be possible to query fewer logging systems 106 than normal in order to obtain the needed information, such as when information from one or more of the logging systems 106 has been pre-cached.

Obtained logs or log-related information satisfying the user query may optionally be combined into a suitable form for responding to the user query at step 424. This may occur in the same or similar manner as step 312 described above. However, this may also include combining data from one or more logging systems 106 with data retrieved from the local index/cache 118, the remote index/cache 120, or both. In some cases, this may even include combining different data retrieved from the local index/cache 118, the remote index/cache 120, or both. The obtained logs or log-related information is presented to the user at step 426. This may occur in the same or similar manner as step 314 described above.

This approach therefore supports the use of local caching and/or remote caching, which may allow at least part of the information requested by a user query to be obtained without requiring querying of the associated logging system(s) 106. Depending on the circumstances, a user query may be partially or completely satisfied using data available in the local index/cache 118, the remote index/cache 120, or both. For example, the local index/cache 118 and/or the remote index/cache 120 may include only part of requested data, such as when the index contains key fields of data but not full log entries. In those cases, the key fields of data may be obtained from the local index/cache 118 and/or the remote index/cache 120, and additional data may be obtained from one or more logging systems 106.

This approach may effectively allow pre-population of the local index/cache 118, the remote index/cache 120, or both prior to receiving a user query. For example, time range-based caching may be performed, such as when data within a more-recent time period is retrieved from the local index/ cache 118 and less-recent data is obtained from one or more logging systems 106. It is also possible to move cached information between the local index/cache 118 and the remote index/cache 120, such as when newer logs or log-related information is stored in the local index/cache 118 and (as the information ages) is moved to the remote index/cache 120 for temporary or longer-term storage.

In terms of the caching process flow to pre-populate at least one index/cache 118, 120 for use during querying, the distributed log query system 112 may optionally include a background process, such as one that is triggered at a specified time interval or that runs continuously. In some cases, the background process may be performed without user interaction. The background process can query the logging systems 106 for specified data, such as data within the past hour or other time period. The logging systems 106 may be queried in parallel, sequentially, or in any other suitable manner. Responses from the logging systems 106 can be obtained by the distributed log query system 112, and logs or log-related information in the responses can be indexed and stored in the local index/cache 118, the remote index/cache 120, or both. Note that if the most-recent logs or log-related information is continuously obtained from the logging systems 106 and stored in the index/cache 118 or 120, queries from users 114 may be satisfied completely using the index/cache 118 or 120 unless those queries request older data or other data that is not maintained in the index/cache 118 or 120. This can be a very practical use case, such as for some users who typically check logs for a recent time period (like the last hour or last several hours through the last day or last several days) when they have an incident, are debugging a problem, or performing other queries. Older logs, such as those that may have to be retained for years due to regulatory or other requirements, may be rarely accessed and do not need to remain cached for prolonged periods of time. This type of approach may provide for significant cost reductions since it may allow for cheaper storages and smaller infrastructure footprints to be used as query volumes can be decreased.

Note that various features described above may be used when storing logs or log-related information in at least one index/cache 118, 120 during these processes. For example, the at least one index/cache 118, 120 may be pre-populated with one or more specific types of data, such as when data related to network access attempts is cached and other data is not. The at least one index/cache 118, 120 may be pre-populated with data that is more recent, such as logs or log-related information generated over the past hour, day, week, or other time period. The at least one index/cache 118, 120 may be pre-populated with data based on users or user groups, such as when logs or log-related information associated with one or more specific users or one or more specific user groups is cached and logs or log-related information associated with other users or user groups is not. The at least one index/cache 118, 120 may be pre-populated with encrypted data, such as when logs or log-related information is encrypted in order to provide increased security or privacy. Different data may be stored in the local index/cache 118 and in the remote index/cache 120, or different data may be stored in different local indexes/caches 118 or in different remote indexes/caches 120. In some cases, the different indexes/caches 118 or 120 may have different query capabilities, different costs, or other differing characteristics.

The operations and process flows described above may be implemented in various ways, and possible implementations may range from more simplistic implementations (such as web-based implementations) to more complex implementations (such as API-based stand-alone applications). As a non-limiting example of a possible implementation, a user may use his or her web browser to access a web page in order to initiate queries to one or more logging systems 106, and the web page may be updated to show the results of the queries (such as in columns or text areas). The results may optionally be shown in the same view as the user's queries. For instance, in some cases, the web page may be split to fit the full user interface(s) of the source logging system(s) 106 and show all results at once to the user. This might not provide optimal user experience but is an effective mechanism to let the user send queries to all logging systems 106 and get a single-pane of view on the results. Of course, other user interfaces and implementations of the distributed log query system 112 may be used.

Although FIGS. 3 and 4 illustrate example methods 300, 400 supporting log analytics or other log-related functions across multiple systems, various changes may be made to FIGS. 3 and 4. For example, while shown as a series of steps, various steps in each of FIGS. 3 and 4 may overlap, occur in parallel, occur in a different order, or occur any number of times (including zero times).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
pre-populating a cache system using a subset of logs or log-related information from multiple logging systems associated with different computing or networking systems, wherein the cache system includes a first cache and a second cache;
receiving a user query identifying one or more criteria associated with the logs or log-related information;
determining whether one or more logs or log-related information satisfying the one or more criteria is contained in the cache system;
in response to determining that the one or more logs or log-related information satisfying the one or more criteria is not contained in the cache system, sending queries identifying the one or more criteria to the multiple logging systems;
obtaining responses from the logging systems, at least some of the responses containing one or more logs or log-related information satisfying the one or more criteria;
presenting the one or more logs or log-related information satisfying the one or more criteria to a user; and
moving at least some of the subset of logs or log-related information from the first cache to the second cache based on age of the subset of logs or log-related information;
wherein the cache system is pre-populated prior to receiving the user query; and
wherein the cache system is pre-populated periodically over time at a specified time interval in order to include, in the cache system, logs or log-related information from the multiple logging systems within a most-recent specified time period.

2. The method of claim 1, wherein the subset of logs or log-related information used to pre-populate the cache system is not identified based on user queries.

3. The method of claim 1, further comprising:
obtaining at least a portion of the one or more logs or log-related information from the cache system in response to determining that the one or more logs or log-related information satisfying the one or more criteria is contained in the cache system.

4. The method of claim 1, wherein pre-populating the cache system comprises obtaining the logs or log-related information from the logging systems within the most-recent specified time period and storing the obtained logs or log-related information in the first cache of the cache system.

5. The method of claim 1, wherein the cache system is pre-populated by executing a background task and without user interaction.

6. The method of claim 1, further comprising at least one of:
pre-populating one or more specific types of data in the cache system;
partitioning pre-populated data in the cache system by user or user group; and
encrypting at least some of the pre-populated data in the cache system.

7. The method of claim 1, wherein:
the first and second caches include different storage locations;
pre-populating the cache system comprises storing different data in the different storage locations; and
the different storage locations are associated with at least one of: different query capabilities and different costs.

8. The method of claim 1, further comprising:
combining the one or more logs or log-related information obtained from the logging systems with one or more additional logs or additional log-related information obtained from the cache system.

9. The method of claim 1, wherein:
the user query is received using a specified query syntax; and
the method further comprises converting the specified query syntax into multiple query syntaxes used by two or more of the logging systems.

10. The method of claim 1, wherein:
different ones of the responses from the logging systems are received in different syntaxes; and
the method further comprises converting the different responses into a specified response syntax.

11. The method of claim 1, further comprising:
authenticating the user; and
sending at least one authentication token to at least one of the logging systems to enable retrieval of information from the at least one of the logging systems.

12. The method of claim 1, wherein pre-populating the cache system comprises:
executing a background task; and
using the background task:
periodically querying the multiple logging systems for newer logs or log-related information within the most-recent specified time period; and
pre-populating the first cache with the newer logs or log-related information; and
wherein the most-recent specified time period includes one or more hours or one or more days.

13. A system comprising:
at least one processing device configured to:
pre-populate a cache system using a subset of logs or log-related information from multiple logging systems associated with different computing or networking systems, wherein the cache system includes a first cache and a second cache;
receive a user query identifying one or more criteria associated with the logs or log-related information;
determine whether one or more logs or log-related information satisfying the one or more criteria is contained in the cache system;

in response to determining that the one or more logs or log-related information satisfying the one or more criteria is not contained in the cache system, send queries identifying the one or more criteria to the multiple logging systems;
obtain responses from the logging systems, at least some of the responses containing one or more logs or log-related information satisfying the one or more criteria;
present the one or more logs or log-related information satisfying the one or more criteria to a user; and
move at least some of the subset of logs or log-related information from the first cache to the second cache based on age of the subset of logs or log-related information;
wherein the at least one processing device is configured to pre-populate the cache system prior to receiving the user query; and
wherein the at least one processing device is configured to pre-populate the cache system periodically over time at a specified time interval in order to include, in the cache system, logs or log-related information from the multiple logging systems within a most-recent specified time period.

14. The system of claim 13, wherein the at least one processing device is configured to obtain at least a portion of the one or more logs or log-related information from the cache system in response to determining that the one or more logs or log-related information satisfying the one or more criteria is contained in the cache system.

15. The system of claim 13, wherein the at least one processing device is configured to pre-populate the cache system by obtaining the logs or log-related information from the logging systems within the most-recent specified time period and storing the obtained logs or log-related information in the first cache of the cache system.

16. The system of claim 13, wherein the at least one processing device is configured to pre-populate the cache system by executing a background task without user interaction.

17. The system of claim 13, wherein:
the first and second caches include different storage locations;
to pre-populate the cache system, the at least one processing device is configured to store different data in the different storage locations; and
the different storage locations are associated with at least one of: different query capabilities and different costs.

18. The system of claim 13, wherein the at least one processing device is further configured to combine the one or more logs or log-related information obtained from the logging systems with one or more additional logs or additional log-related information obtained from the cache system.

19. The system of claim 13, wherein the at least one processing device is configured to at least one of:
receive the user query using a specified query syntax and convert the specified query syntax into multiple query syntaxes used by two or more of the logging systems; and
receive different ones of the responses from the logging systems in different syntaxes and convert the different responses into a specified response syntax.

20. The system of claim 14, wherein the at least one processing device is further configured to:
authenticate the user; and send at least one authentication token to at least one of the logging systems to enable retrieval of information from the at least one of the logging systems.

21. A non-transitory computer readable medium containing instructions that when executed cause at least one processor to:

pre-populate a cache system using a subset of logs or log-related information from multiple logging systems associated with different computing or networking systems, wherein the cache system includes a first cache and a second cache;

receive a user query identifying one or more criteria associated with the logs or log-related information;

determine whether one or more logs or log-related information satisfying the one or more criteria is contained in the cache system;

in response to determining that the one or more logs or log-related information satisfying the one or more criteria is not contained in the cache system, send queries identifying the one or more criteria to the multiple logging systems;

obtain responses from the logging systems, at least some of the responses containing one or more logs or log-related information satisfying the one or more criteria;

present the one or more logs or log-related information satisfying the one or more criteria to a user; and move at least some of the subset of logs or log-related information from the first cache to the second cache based on age of the subset of logs or log-related information;

wherein the instructions when executed cause the at least one processor to pre-populate the cache system prior to receiving the user query; and wherein the instructions when executed cause the at least one processor to pre-populate the cache system periodically over time at a specified time interval in order to include, in the cache system, logs or log-related information from the multiple logging systems within a most-recent specified time period.

\* \* \* \* \*